Jan. 4, 1955    R. W. JENSEN    2,698,568
PRESSURE CONTROL MECHANISM
Filed April 5, 1951    2 Sheets-Sheet 1

RAYMOND W. JENSEN,
INVENTOR.

BY

ATTORNEY

RAYMOND W. JENSEN,
INVENTOR.

ATTORNEY

United States Patent Office 2,698,568
Patented Jan. 4, 1955

2,698,568

PRESSURE CONTROL MECHANISM

Raymond W. Jensen, Los Angeles, Calif., assignor to The Garrett Corporation, Los Angeles, Calif., a corporation of California Application April 5, 1951, Serial No. 219,373

8 Claims. (Cl. 98—1.5)

This invention relates generally to fluid pressure regulating or control mechanisms and relates more particularly to fluid pressure ratio control mechanisms.

While the invention may be useful in various installations, it has particular utility in connection with pressurization and air conditioning systems, and is hereinafter shown and described, by way of example of one use for said mechanism, embodied in such a system.

Aircraft air conditioning systems with their associated superchargers, compressors, and turbines frequently operate at their maximum R. P. M. thus producing a condition where control of pressures and cooling of operating parts reaches a critical point and where continued efficient operation is dependent on proper control of pressures in the system.

It has been found that when the inlet air pressure of a primary compressor reaches a given point, contingent on the type of compressor wheel employed, the flow of air in the impeller will stall creating a condition where little or no flow is passed through the compressor. This lack of cooling flow of air may result in the heating up of bearings and their burning out, with the resulting failure of the air conditioning system, and hence it is necessary to control the inlet pressure so as to overcome this difficulty.

There have been means proposed for controlling the primary compressor inlet pressure but with such arrangements it has been found that there is a lag in the operation of the control or a large overshoot occurs; hence the fine degree of control necessary for the proper operation of the system is lacking.

It is, therefore, an object of the present invention to provide a pressure regulating mechanism that is rapid, smooth and reliable in operation and which may provide the fine control necessary in the above described systems.

Another object of the invention is to provide mechanism of this character that provides accurate modulating of pressures.

Still another object of the invention is to provide mechanism of this character wherein undesirable lag in changes of position of the valve thereof is minimized or eliminated.

A further object of the invention is to provide mechanism of this character having smooth flow characteristics.

A still further object of the invention is to provide pressure ratio control of this character that is efficient and compact.

Another object of the invention is to provide mechanism of this character adapted to protect the primary compressor of pressure control and air conditioning systems from overload conditions while providing a maximum of refrigeration capacity.

Still another object of the invention is to provide mechanism of this character capable of regulating the ratio of a refrigeration or air conditioning unit compressor inlet or supercharger outlet pressure to ambient atmospheric pressure.

It is still another object of the invention to provide mechanism of this character that may be operated at any valve position from a full closed to full open so as to establish a balanced modulated flow through said valve.

A further object of the invention is to provide mechanism of this character capable of sensing minute changes in the pressure ratio between a supercharger outlet or compressor inlet and ambient atmosphere.

Further objects and advantages of the invention will be brought out in the following part of the specification.

Referring more particularly to the drawings which are for illustrative purposes only:

Figure 1:
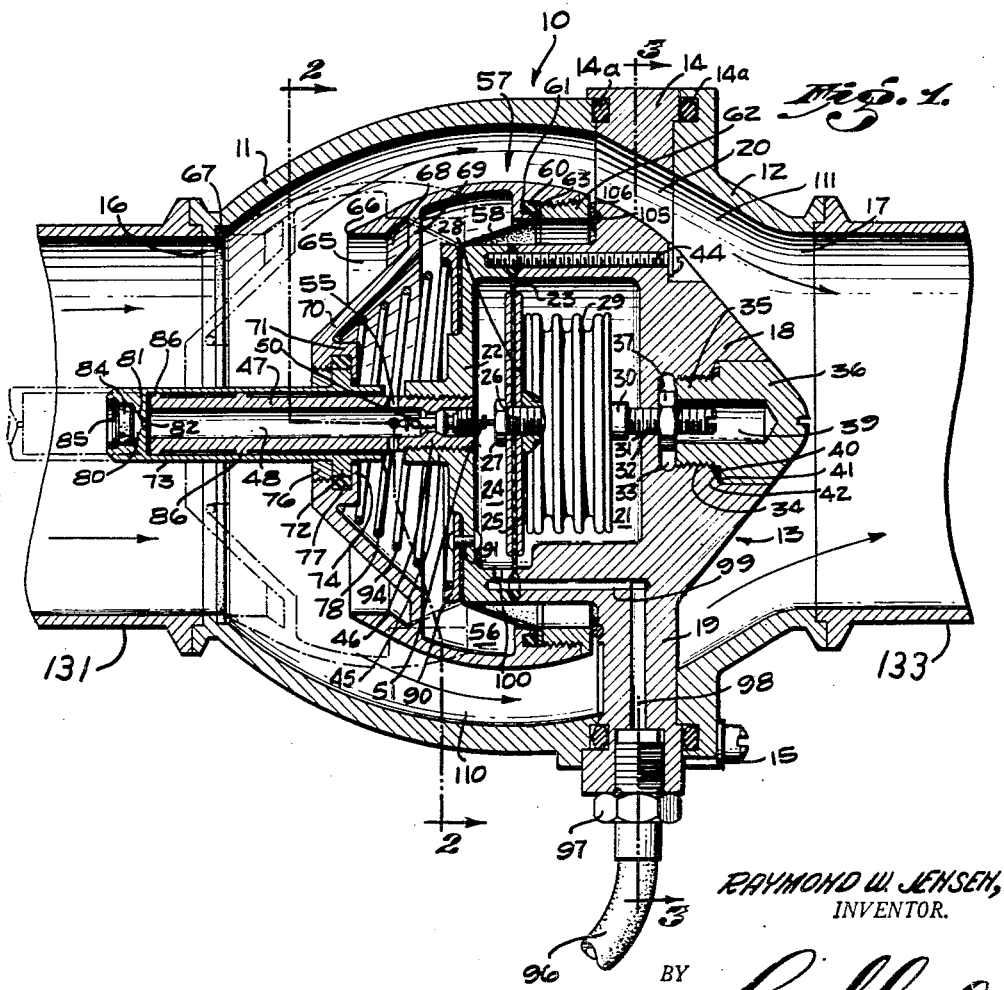
Fig. 1 is an enlarged longitudinal section through said pressure ratio control means.
Figure 2:
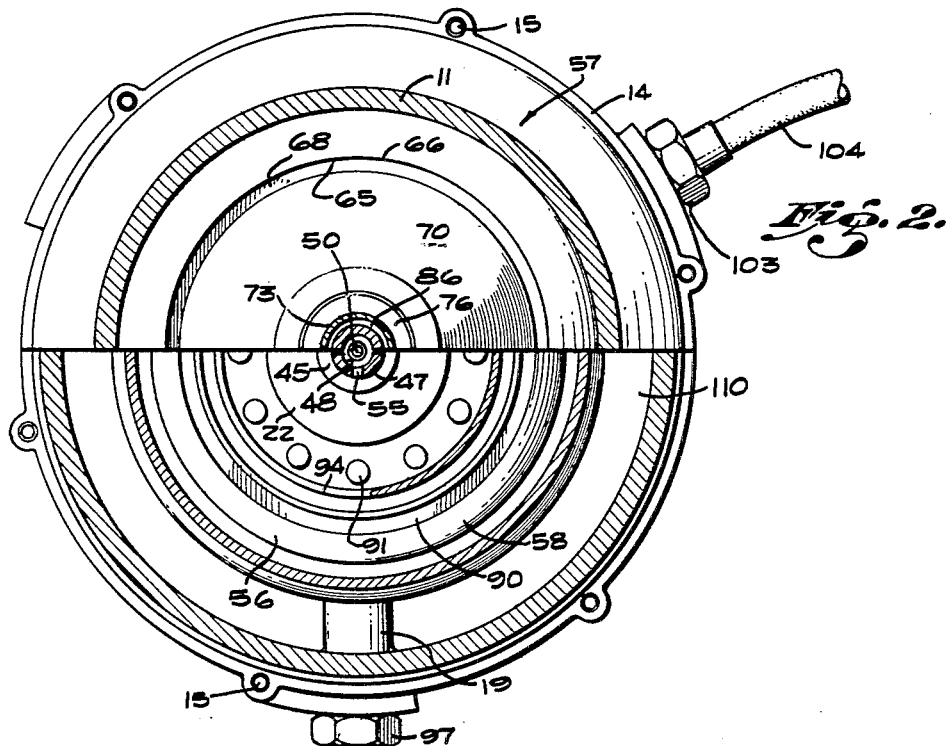
Fig. 2 is a sectional view taken on line 2—2 of Fig. 1.
Figure 3:
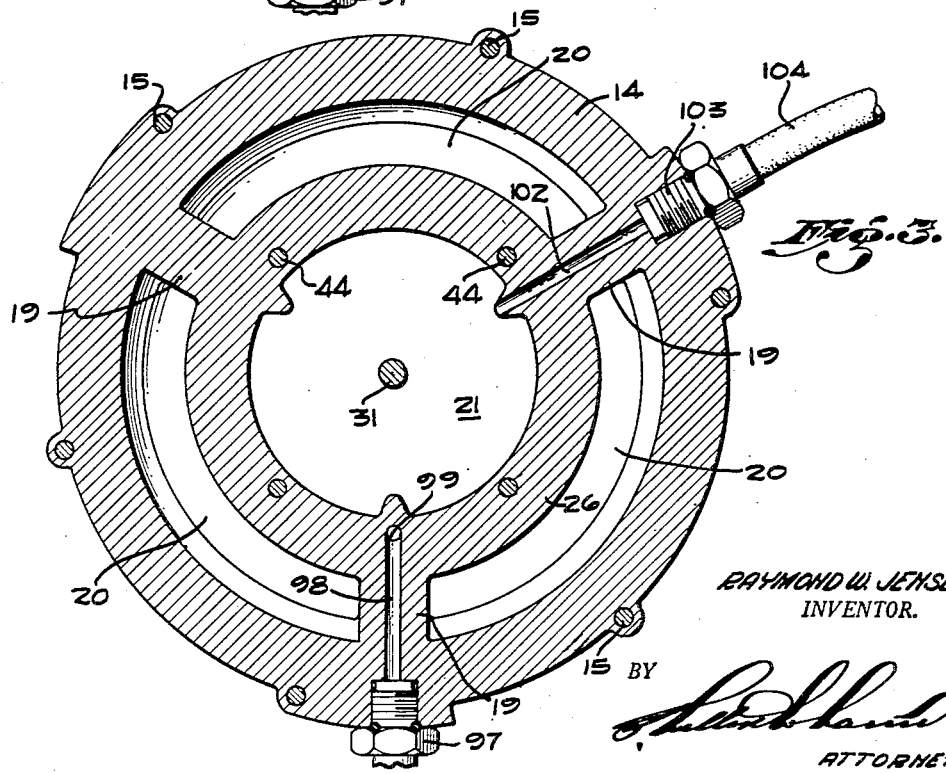
Fig. 3 is a cross-sectional view taken on line 3—3 of Fig. 1.

Referring more particularly to Figs. 1, 2 and 3, the valve mechanism, indicated generally at 10, includes a main housing having a bell shaped body portion 11 and a cap 12, there being a servo housing, indicated generally at 13, having an annular part 14 secured between the body portion 11 and the cap 12, these parts being secured together by any suitable means such as screws 15, peripherally spaced apart about the housing. The parts 11, 12 and 14 of the housing define an enlarged chamber having an inlet 16 and an outlet 17 to which conduits may be attached, said conduits being hereinafter more particularly described.

The servo housing 13 comprises a housing body 18, disposed within the chamber formed by the housing members, which tapers toward the outlet 17. The servo housing body 18 is of smaller outside diameter than the chamber in which it is disposed and is supported by radially extending arms 19 connecting said servo housing body with the annular ring 14, there being arcuate shaped openings 20 through which fluid may flow.

The servo housing has a cavity therein, part of which comprises a chamber 21 formed in the body 18 and which faces upstream. The chamber 21 is closed at the upstream end by a cover 22 which is in the shape of a shallow cup, and a servo diaphragm 23 is marginally clamped between the servo cover 22 and the servo housing body 18 so that the chamber 21 is on one side of said diaphragm and a chamber 24, defined by said cover 22, is on the other side of said diaphragm.

Washers 25 are provided, one on each side, of the diaphragm 23, said washers being of smaller diameter than the chambers 21 and 24 and support the central area of said diaphragm, said washers being clamped to the diaphragm by any suitable means such as the bolt 26 which has a head 27 disposed at one side of the washer 25. The bolt 26 has a threaded end threadably received in a tapped opening in a boss of the adjacent end plate 28 of an evacuated bellows 29 thereby also securing the bellows 29 to said diaphragm. The diaphragm 23 is a differential pressure responsive movable wall and the bellows 29 is an absolute pressure responsive device which isolates a central portion of one side of the diaphragm 23 from the pressure in the chamber 21. At the end, opposite the diaphragm 23, the bellows 29 is provided with a stud 30 which has a threaded portion 31 extending through an opening 32 in the bottom of the chamber 21. The opening 32 is enlarged at 33 to form a chamber having a threaded portion 34 for reception of a threaded end portion 35 of a locking nut 36. The threaded portion 31 of the stud 30 is provided with a nut 37 for securing said stud in any desired adjusting position, said nut 37 being locked in position by a locking bolt 36, bolt 36 being provided with a central bore 39 for reception of the outer end of the portion 31 of stud 30. A gasket 40 provides a seal between a shoulder 41 of the locking bolt 36 and a shoulder 42 in the servo housing body 18.

The cover 22 is secured to the servo housing body 18 by means of bolts 44 which are annularly spaced apart, as best shown in Fig. 3, and said cover is provided with a central boss 45 which extends toward the inlet 16 and has a threaded bore therein, on the axis of the mechanism for threadable reception of the threaded end 46 of a tubular guide or pilot shaft 47 which has a central bore 48 therein. The inner end of the shaft 46 is so formed as to operably receive a valve 50 which may be of any suitable type but which is shown as being a "Schrader" valve which has a valve pin 51 adapted to be engaged by the head 27 of the bolt 26.

The shaft 46 has a plurality of cross bores 55 which connect the longitudinal bore 48 with a chamber 56 defined between the walls of a main valve member, indicated generally at 57, the adjacent end of the servo housing, and a valve diaphragm 58.

The diaphragm 58 has a peripheral bead 60 received in annular groove 61 in the downstream end of the valve member 57 and the bead is retained in the groove by an annular retainer ring 62 threadably engaging the valve member 57, a washer 63 being interposed between the inner end of the retainer ring 62 and the adjacent surface of the bead 60.

The valve member 57 has an annular recess 65 at the upstream end and there is a sharp edge 66 at the outer end of said recess which edge is adapted to engage a valve seat comprising a seating ring 67 disposed in an enlarged recess in the bell shaped body 11 adjacent the inlet thereof.

The recess 65 has a portion 68 which is inclined outwardly and is defined at the bottom by an inwardly extending wall 69 from which a frusto-conical central portion 70 extends through the recess 65. The frusto-conical portion 70 has an inwardly extending boss 71 with an axial opening for reception of the flange 72 of a guide sleeve 73. The inner face of the flange 72 rests against a flange 74 which extends inwardly of the plane of the central opening in the boss 71 and serves as a seat for said flange 72. Guide 73 is secured in position by an externally threaded nut 76 and a sealing gasket 77, peripherally surrounding the flange 72, is provided in a recess in the boss 71. The guide 73 has a portion 78 which extends inwardly of the chamber 56 and which terminates short of the cross bores 55 when the valve member 57 is in the fully opened position so that the chamber 56 is at all times in communication with the bore 48. The forwardly projecting portion of the guide 73 terminates in a chamber 80 closed at the inner end by a wall 81 through which extends bleed passage or orifice 82 connecting the chamber 81 with the interior of the guide 73 and the bore 48 of the pilot shaft 47. Within the chamber 80 is a filter 84 which may be of any suitable material such as "fiberglass" or the like to strain dust particles and/or other foreign material from the air passing into the sleeve 73 and thence into other parts of the mechanism. The filter 84 is secured in the chamber 80 by a snap ring 85 received in a suitable groove provided therefor in a well-known manner.

The guide 73 slidably receives the pilot shaft 47 which has outwardly extending annular flanges 86 which serve as bearings for the guide and shaft, said flanges 86 sliding on the interior surface of the tubular guide 73. The guide slides on the shaft 47 with movements of the valve member 57 which carries said guide, the latter insuring proper movement and action of the valve member, and preventing said member from tilting and getting out of axial alignment.

The valve diaphragm 58 has an inner annular portion which is clamped to the cover 22 by means of a retainer 90 which is secured to the cover by any suitable means such as rivets 91 or the like. The retainer 90 also serves as a spring retainer for the adjacent end of a spring 94 disposed within the chamber 56 and reacting against said retainer 90 and the forward end of the frusto-conical portion 70 being disposed about the boss 71. The spring 94 thus urges the valve member 57 in the closing direction.

The chamber 56 is connected with the flow passage by means of the chamber 80, bore 48 and cross bores 55 while the chamber 24 is connected to ambient atmosphere by means of a line 96, which may be termed the sensing line, the latter being connected to the ring 14 by a screw threaded plug 97 having the usual passage therethrough and which passage is connected with a passage 98 in the servo housing body. The passage 98, in turn, is connected with a passage 99 extending longitudinally of the servo housing body and connected by still another passage, 100, with said chamber 24. Chamber 24 may also be connected with the bore 48 through the valve 50 as will be described more particularly hereinafter.

The chamber 21 is connected with some other source of pressure by means of a passage 102 in the servo housing body, screw threaded plug 103 and conduit 104, the plug 103 serving as the means for connecting the conduit 104 to the servo housing body.

When the valve member 57 is in the fully opened position as shown in Fig. 1, the downstream end thereof is adapted to engage a stop 105 which is shown as comprising an O ring received in a groove provided therefor in an outwardly extending shoulder 106 of the servo housing body. The outer configuration of the valve member 57 conforms to the general shape of the interior surface of the bell shaped body 11 of the valve housing so as to provide a flow passage 110 between the valve member 57 and the interior of the body 11. Fluid, flowing through the passage 110 is adapted to flow through the passages 20 in the servo housing body and thence through a passage 111 defined by the cap 12 and the servo housing body 18.

Figure 4:
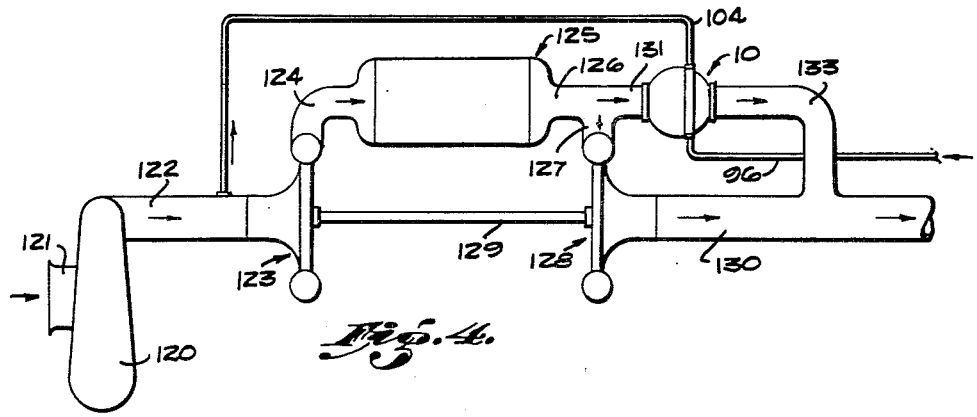
Fig. 4 is a diagrammatic view of an air conditioning or refrigeration system having a pressure ratio control mechanism embodying the present invention incorporated in said refrigeration system for controlling the pressures therein.

The air conditioning system shown in Fig. 4 discloses one type of system in which the present valve mechanism may be used. This system includes a supercharger 120, driven from any suitable source of power. The supercharger has an inlet 121, which may be a ram duct, and an outlet connected by a conduit 122 with the inlet of a compressor, indicated generally at 123. It will be obvious that the pressure in the conduit 122 may be considered either as the supercharger outlet pressure or the compressor inlet pressure.

The compressor 123 has an outlet connected with a conduit 124 which leads to a heat exchanger, indicated generally at 125 which serves to cool the air passing therethrough from the conduit 124 to a conduit 126 having a branch 127 connected with the inlet of a turbine, indicated generally at 128. The turbine is connected with the compressor by means of a shaft 129 whereby the compressor is driven by said turbine. Turbine 128 has an outlet connected with a duct 130 which leads to the aircraft cabin.

The system includes a by-pass about the turbine and said by-pass comprises a branch 131, the control valve 10 and conduit 133. The branch 131 of the conduit 126 is connected to the inlet 16 of the valve 10 and the outlet 17 of said valve is connected to the conduit 133 which, in turn, is connected with the conduit 130. The conduit 104 is connected with the conduit 122 which connection may be termed the pneumatic line.

The ratio control valve will control the air conditioning system and regulates the ratio of the pressure in the conduit 122 to ambient atmospheric pressure, when such ratio reaches a predetermined value, by by-passing air about the driving turbine.

It will be understood that the pressure in chamber 21 is substantially that in the conduit 122 and the pressure in chamber 24 is ambient atmospheric pressure. The pressure in chamber 56 is substantially the same as that in the inlet of the valve mechanism when the valve 50 is closed. Therefore, the main valve member 57 is closed under the influence of spring 94 when said valve 50 is in the closed position.

As the valve 50 is normally in the closed position, pressure entering the housing at 16 is applied to the foreward face of the valve member 57. This same pressure is bled through the orifice 82, bore 48 and crossbores 55 into the chamber 56 to maintain the balance of fluid pressure on opposite sides of said valve member 57. The effective area of the front side of the valve member exposed to inlet pressure and urged in the opening direction thereby is substantially balanced by an interior area of the valve member 57 subjected to pressure in the chamber 56 and urging the valve member in the closing direction, the difference in areas being offset by the effective areas of the diaphragm 58.

The pressure in the evacuated bellows chamber 21, during operation of the system, is considerably higher than the pressure in the ambient air chamber 24. However, since the ambient air pressure (lower pressure) is exerted over a greater area of the diaphragm 23 than the high pressure in the chamber 21, the total forces on the respective sides of the diaphragm become substantially equal when the pressure ratio equals the diaphragm bellows area ratios.

In other words, atmospheric pressure is applied to the left-hand side of the diaphragm 23 in the chamber 24 while the other side of the diaphragm 61 is subjected to the higher pressure derived from conduit 122 and applied in the chamber 21, the latter pressure also being applied to the evacuated bellows 29. The resultant force is equivalent to the pressure of conduit 122 acting on an area representing the difference between the effective cross-sectional area of the diaphragm 23 and the effective cross-sectional area of the bellows 29. The area of the diaphragm 23 outside of the effective area of the bellows 29 is subjected to high pressure. The ratio of the area of the side of the diaphragm 23 (exposed to ambient atmospheric pressure) to the area of the other side of the diaphragm, against which pressure from conduit 122 is effective (the area lying outside the effective area of the bellows 29, as previously stated) is selected so as to equal the ratio between the latter pressure and atmospheric pressure that is to be determined by the ratio control. As long as this ratio is below the predetermined critical value, the head 27 of the bolt 26 will not engage the valve stem 51.

However, when a predetermined pressure ratio has been reached in the diaphragm-bellows chambers, 21 and 24, the head 27 will be closely adjacent the free end of the valve stem 51, and an increase in this pressure ratio will cause the diaphragm 23 to move toward the left so that the head 27 of the bolt 26 will engage the valve stem 51 and effect opening of the valve 50, thus permitting the pressure in the interior of the valve chamber 56 to bleed to atmosphere through the ambient air chamber 24. The reduction in pressure in the chamber 56 will permit the pressure at the inlet 16 to overcome the valve closing force of spring 94 and effect opening of the valve member 57. A decrease in the pressure ratio in the diaphragm bellows chamber will cause rightward movement of the diaphragm 23 so that valve 50 will close or partially close, thereby allowing a build up of pressure in the chamber 56 so that the spring 94 will again close the valve member 57.

The operation of the valve is calibrated and generally the valve begins to open when the pressure ratio across the primary compressor exceeds 1.9 to 1, thereby passing air around the cooling turbine. The valve will modulate in either direction of operation to prevent the maximum ratio from being exceeded.

I claim:

1. In fluid flow control mechanism: a main housing having an inlet and an outlet; a pressure responsive valve within the housing adapted, when closed, to prevent fluid flow through said housing, said valve being urged in the opening direction by fluid pressure of the inlet end of the housing applied to the upstream face of said valve; means for applying yielding mechanical pressure on said valve in the closing direction; a servo housing within the main housing; a flexible element connecting the valve with said servo housing, said valve, flexible element and servo housing defining a pressure chamber, the fluid pressure in said chamber being applied to the other face of said valve for urging the latter in the closing direction; a restricted inlet connection, and an outlet connection for said pressure chamber; and pressure ratio control means adapted to control the outlet for said pressure chamber, said servo housing having a cavity therein, said pressure ratio control means comprising a movable wall dividing said cavity into a pair of chambers, one of said chambers being connected with a source of higher pressure and the other of said chambers being connected with a region of lower pressure, an absolute pressure responsive device within the chamber having the higher pressure connection, said device having one end fixed and the other end connected with said movable wall to isolate a portion thereof from the higher pressure.

2. In a fluid pressure control mechanism; a main housing; a servo housing within the main housing and supported in spaced relation to the interior wall of said main housing, said servo housing having a cavity therein; a guide secured to said servo housing and extending axially upstream thereof, said guide being tubular; a valve member slidably mounted on said tubular guide, said valve member including a pressure responsive part and an axial sleeve slidable on said guide, said sleeve having a restricted orifice for the entrance of fluid into the interior of said tubular guide, pressure on the upstream side of said valve member urging same in the opening direction; a diaphragm connecting the servo housing with the valve member for defining therewith a pressure chamber with the pressure in said chamber urging the valve member in the closing direction, there being connecting means between the interior of the tubular guide and said chamber; a pressure responsive diaphragm in the cavity of said servo housing dividing same into a pair of chambers, one of said chambers being adapted to be connected with a low pressure region; a pilot valve controlled connection between the interior of the tubular guide and said chamber, said pilot valve being openable by movement of said diaphragm in one direction; an absolute pressure responsive device in the other chamber within the servo housing, said device having one end fixed and the other end connected to said diaphragm, and means for connecting said other chamber with a source of higher pressure.

3. In a fluid pressure control mechanism: a main housing; a servo housing within the main housing and supported in spaced relation to the interior wall of said main housing, said servo housing having a cavity therein; a guide secured to said servo housing and extending axially upstream thereof, said guide being tubular; a valve member biased in the closing direction, said valve member including a pressure responsive part and an axial sleeve slidably mounted on said guide, said sleeve having a restricted orifice for the entrance of fluid into the interior of said tubular guide, pressure on the upstream side of said valve member urging same in the opening direction; a diaphragm connecting the servo housing with the valve member for defining therewith a pressure chamber with the pressure in said chamber urging the valve member in the closing direction, there being connecting means between the interior of the tubular guide and said chamber; a pressure responsive diaphragm in the cavity of said servo housing dividing same into a pair of chambers, one of said chambers being adapted to be connected with a low pressure region; a pilot valve controlled connection between the interior of the tubular guide and said chamber, said pilot valve being openable by movement of said diaphragm in one direction; an absolute pressure responsive device in the other chamber within the servo housing, said device having one end fixed and the other end connected to said diaphragm, and means for connecting said other chamber with a source of higher pressure.

4. In a fluid pressure control mechanism: a main housing; a servo housing within the main housing and supported in spaced relation to the interior wall of said main housing, said servo housing having a cavity therein; a guide secured to said servo housing and extending axially upstream thereof, said guide being tubular; a valve member, said valve member including a pressure responsive part and an axial sleeve slidably mounted on said guide, pressure on the upstream side of said valve member urging same in the opening direction; means biasing said valve member in the closing direction; a diaphragm connecting the servo housing with the valve member for defining therewith a pressure chamber with the pressure in said chamber urging the valve member in the closing direction, there being a restricted connection leading to said chamber and facing upstream to receive the impact of fluid flowing through the main housing; a pressure responsive diaphragm in the cavity of said servo housing dividing same into a pair of chambers, one of said chambers being adapted to be connected with a low pressure region; a pilot valve controlled connection between the interior of the tubular guide and said chamber, said pilot valve being openable by movement of said diaphragm in one direction; an absolute pressure responsive device in the other chamber within the servo housing, said device having one end fixed and the other end connected to said diaphragm, and means for connecting said other chamber with a source of higher pressure.

5. In a fluid pressure control mechanism: a main housing; a servo housing within the main housing and supported in spaced relation to the interior wall of said main housing, said servo housing having a cavity therein; a guide secured to said servo housing and extending axially upstream thereof, said guide being tubular; a valve member, said valve member including a pressure responsive part and an axial sleeve slidably mounted on said guide, said sleeve having a restricted orifice for the entrance of fluid into the interior of said tubular guide, pressure on the upstream side of said valve member urging same in the opening direction; yielding means urging said valve member in the closing direction; a diaphragm connecting the servo housing with the valve member for defining therewith a pressure chamber with the pressure in said chamber urging the valve member in the closing direction, there being connecting means between the interior of the tubular guide and said chamber, said valve and servo housing forming a streamlined unit when the valve member is in the open position; a pressure responsive diaphragm in the cavity of said servo housing dividing same into a pair of chambers, one of said chambers being adapted to be connected with a low pressure region; a pilot valve controlled connection between the interior of the tubular guide and said chamber, said pilot valve being openable by movement of said diaphragm in one direction; an absolute pressure responsive device in the other chamber within the servo housing, said device having one end fixed and the other end connected to said diaphragm, and means for connecting said other chamber with a source of higher pressure.

6. In a fluid flow control mechanism: a main housing having an inlet and an outlet: a pressure responsive valve within the housing adapted, when closed, to prevent fluid flow through said housing, said valve being urged in the opening direction by fluid pressure of the inlet end of the housing applied to the upstream face of said valve; means for applying yielding mechanical pressure on said valve in the closing direction; a servo housing within the main housing, said servo housing having an annular shoulder; an annular resilient stop extending upwardly of the surface of said shoulder, said valve being adapted to engage said stop when said valve is in the open position; a flexible element connecting the valve with said servo housing, said valve, flexible element and servo housing defining a pressure chamber, the fluid pressure in said chamber being applied to the other face of said valve for urging the latter in the closing direction; an inlet connection and an outlet connection for said pressure chamber; and pressure ratio control means within the servo housing, said pressure ratio control means being adapted to control the outlet for said pressure chamber.

7. Mechanism for controlling the flow of fluid, comprising: a fluid passage having an inlet and an outlet; a valve member within said passage, said valve member being adapted, when closed, to prevent fluid flow through the passage, said valve member being urged in the opening direction by fluid pressure of the inlet end of said passage applied to the upstream face of said valve member; means for applying yielding mechanical pressure and means for applying said fluid pressure to the valve member in the valve closing direction; and pressure ratio control means for relieving said valve member of the fluid pressure urging same in the closing direction when the pressure ratio between two regions of pressure is below a predetermined value so that fluid pressure urging the valve member in the valve opening direction may overcome said yielding mechanical pressure and cause said valve member to move in the opening direction, said ratio control means including means defining a cavity; a movable wall dividing said cavity into a pair of chambers, one of said chambers being connected with a source of higher pressure and the other of said chambers being connected with a region of lower pressure, an absolute pressure responsive device within the chamber having the higher pressure connection, said device having one end fixed and the other end connected with said movable wall to reduce the effective action of the pressure in the chamber having the higher pressure on said movable wall.

8. In a fluid flow control mechanism: a main housing having an inlet and an outlet; a pressure responsive valve within the housing adapted, when closed, to prevent fluid flow through said housing, said valve being urged in the opening direction by fluid pressure of the inlet end of the housing applied to the upstream face of said valve; means for applying yielding mechanical pressure on said valve in the closing direction; a servo housing within the main housing, said servo housing having an annular shoulder; an annular resilient stop extending upwardly of the surface of said shoulder, said valve being adapted to engage said stop when said valve is in the open position; a flexible element connecting the valve with said servo housing, said valve, flexible element and servo housing defining a pressure chamber, the fluid pressure in said chamber being applied to the other face of said valve for urging the latter in the closing direction; an inlet connection and an outlet connection for said pressure chamber; and pressure ratio control means controlling the outlet for said pressure chamber.

References Cited in the file of this patent

UNITED STATES PATENTS

| Number | Name | Date |
|---|---|---|
| 2,419,707 | Cooper | Apr. 29, 1947 |
| 2,425,000 | Paget | Aug. 5, 1947 |
| 2,436,183 | Snedecor | Feb. 17, 1948 |
| 2,463,492 | Arthur | Mar. 1, 1949 |